(12) United States Patent
Sardella et al.

(10) Patent No.: US 7,934,032 B1
(45) Date of Patent: Apr. 26, 2011

(54) INTERFACE FOR ESTABLISHING OPERABILITY BETWEEN A PROCESSOR MODULE AND INPUT/OUTPUT (I/O) MODULES

(75) Inventors: Steven D. Sardella, Hudson, MA (US); Stephen Strickland, Foxboro, MA (US); James C. Tryhubczak, Cumberland, RI (US); John F. Phinney, Westford, MA (US)

(73) Assignee: EMC Corporation, Hopkinton, MA (US)

( * ) Notice: Subject to any disclaimer, the term of this patent is extended or adjusted under 35 U.S.C. 154(b) by 110 days.

(21) Appl. No.: 11/864,140

(22) Filed: Sep. 28, 2007

(51) Int. Cl.
G06F 13/00 (2006.01)
G06F 13/20 (2006.01)
G06F 13/36 (2006.01)

(52) U.S. Cl. ........ 710/104; 710/311; 710/313; 710/314; 710/316

(58) Field of Classification Search .................. 710/311, 710/313, 314, 316, 104
See application file for complete search history.

(56) References Cited

U.S. PATENT DOCUMENTS

| 7,099,969 B2 * | 8/2006 | McAfee et al. | 710/107 |
| 7,325,086 B2 * | 1/2008 | Kong et al. | 710/307 |
| 2009/0006708 A1 * | 1/2009 | Lim | 710/314 |

* cited by examiner

Primary Examiner — Mark Rinehart
Assistant Examiner — Jeremy S Cerullo
(74) Attorney, Agent, or Firm — Guerin & Rodriguez, LLP; Michael A. Rodriguez

(57) ABSTRACT

Described are electronics systems and methods for distributing a limited number of lanes of a PCI Express-based processor (CPU) module among a plurality of PCI Express-based I/O modules with which the CPU module is in communication. The CPU module receives a code from each I/O module over a sideband interface between that I/O module and the CPU module. The coded signal represents a link-width capability of the I/O module. The CPU module is configured to allocate a link width to each I/O module based on the fixed number of lanes and the link-width capability as represented by the coded signal received from that I/O module. The link between CPU module and each I/O module is trained in accordance with the link width allocated to that I/O module.

15 Claims, 7 Drawing Sheets

INTERFACE FOR ESTABLISHING OPERABILITY BETWEEN A PROCESSOR MODULE AND INPUT/OUTPUT (I/O) MODULES

RELATED APPLICATION

This utility application has a common inventor and is commonly owned with co-pending utility patent application "Marking and Faulting Input/Output Ports of an Electronics System" by Sardella et al, filed on the same day herewith.

FIELD OF THE INVENTION

The present invention relates generally to electronics systems. More particularly, the present invention relates to an interface for establishing interoperability between electronics modules of a PCI-Express (PCI-E) system having disparate link-width capabilities.

BACKGROUND

In various electronics industries, particularly the storage industry, PCI-E has become a popular communications interface for connecting input/output (I/O) devices to root complexes. In a typical PCI-E system, a root complex connects a processor system (with one or more CPUs and memory) to various endpoints (e.g., I/O devices) over point-to-point serial connections, referred to as links. Each link has a width determined by its number of lanes. Each lane contains two pairs of wires: one pair for receiving and the other for transmitting signals. Commonly used link widths include four lanes (×4), eight lanes (×8), and 16 lanes (×16).

To produce flexible, manufacturable, and serviceable products, some electronics systems (e.g., embedded storage arrays) implement the root complex and I/O devices on separate pluggable modules (i.e., as CPU modules and I/O modules, respectively). A given CPU module typically communicates with a set of I/O modules. The number of I/O modules in the set can vary from product to product, depending upon, for example, mechanical restrictions such as the physical sizes of the various modules and of the enclosure, and upon the particular market (e.g., high-end or low-end) for which the product is designed.

The electrical matching between a CPU module and a set of I/O modules presents various problems. For one, the root complex of the CPU module supports a fixed number of PCI-E lanes, which need routing to the slot connectors of the set of I/O modules. If a perfect multiple of lanes is not available, the I/O module slot connectors may need to receive different numbers of lanes. Further, the components on different I/O modules (e.g., Fibre Channel, Ethernet, SAS (serial attached SCSI)) may support different lane widths (e.g., ×4, ×8) regardless of the lane-width capabilities routed to a given I/O module slot connector. PCI-E switches can mitigate this connectivity imbalance, but generally affect the performance of the I/O module slots to which such PCI-E switches attach. In addition, the various CPU modules available in the market have varying capabilities (e.g., different speeds).

Standard and custom PCI-E chipsets presently incorporate automated features that relieve some of the above-described problems. Link-width negotiation allows two interconnected modules to train to the lowest common link width. Speed negotiation enables training to the lowest speed that both modules on the link can support. In addition, some root complexes support auto-bifurcation: the root complex is able to differentiate between a single large-width I/O module and multiple smaller-width I/O modules, and train accordingly. Notwithstanding, some root complexes cannot bifurcate automatically and require pre-configuration if the root complex is to bifurcate during training. Despite these automated features, however, limitations remain that impede the ability to flexibly dedicate a specific number of lanes to each I/O module slot connector in order to achieve fully subscribed connectivity across a broad range and multiple generations of CPU and I/O modules.

SUMMARY

In one aspect, the invention features a method for distributing lanes among PCI Express-based input/output (I/O) modules. An electronics system has a PCI Express-based processor (CPU) module in communication with the plurality of PCI Express-based input/output (I/O) modules. The CPU module has a limited number of lanes with which to communicate with the I/O modules. The CPU module receives a coded signal from each I/O module through a sideband interface. The coded signal represents a link-width capability of the I/O module. The CPU module is configured to allocate a link width to each I/O module based on the fixed number of lanes and the link-width capability as represented by the coded signal received from that I/O module. The link between CPU module and each I/O module is trained in accordance with the link width allocated to that I/O module.

In another aspect, the invention features an electronics system comprising a PCI Express-based I/O module and a PCI Express-based central processing unit (CPU) module in electrical communication with the I/O module through a PCI Express interface and through a sideband interface. The CPU module receives through the sideband interface a coded signal representing a link-width capability for the I/O module. The CPU module is configured to allocate a link width to the I/O module based on the link-width capability represented by the coded signal received from the I/O module. The I/O module and CPU module train in accordance with the link-width allocated to the I/O module.

In still another aspect, the invention features an electronics system comprising a plurality of PCI Express-based I/O modules and a PCI Express-based central processing unit (CPU) module in electrical communication with each I/O module through a PCI Express interface and through a sideband interface. The CPU module has a memory controller hub (MCH) device and switching logic. The CPU module receives from each I/O module through a sideband interface a coded signal representing a link-width capability for that I/O module. The MCH device and switching logic are configured to allocate a link width to each I/O module based on link-width capability represented by the coded signal received from that I/O module and on an aggregate link-width demand of the I/O modules. Each I/O module trains a link with the CPU module in accordance with the link-width allocated to that I/O module.

BRIEF DESCRIPTION OF THE DRAWINGS

The above and further advantages of this invention may be better understood by referring to the following description in conjunction with the accompanying drawings, in which like numerals indicate like structural elements and features in the various figures. The drawings are not meant to limit the scope of the invention. For clarity, not every element may be labeled in every figure. The drawings are not necessarily to scale, emphasis instead being placed upon illustrating the principles of the invention.

DETAILED DESCRIPTION

In electronics systems embodying the invention, PCI-E-based electronic modules interconnected by a point-to-point serial connection communicate their link-width capabilities to each other through a sideband interface. As used herein, a sideband interface refers to a set of coded signals that the interconnected electronic modules exchange over specified signal paths. In addition, such signal paths do not carry PCI-E traffic (i.e., payload) between the interconnected electronic modules.

Each recipient of the other's link-width capabilities through the sideband interface can use that information to ensure an optimized outcome when the electronic modules subsequently train. For example, one electronic module can dynamically allocate a sufficient number of lanes to satisfy fully the link-width request of the other electronic module. Then when the electronic modules train to the lowest common link width, they train to a link width predetermined to be optimal for conducting communications between the electronic modules. Examples of electronic modules that can practice the invention include, but are not limited to, CPU modules and I/O modules. Although the following description refers primarily to CPU modules and I/O modules, any pair of interconnected electronic modules having disparate PCI-E link-width capabilities can beneficially practice of the invention.

In brief overview, one embodiment of the sideband interface includes two sets of signals: (1) a first set of signals sent from an I/O module to a CPU module; and (2) a second set of signals sent from the CPU module to the I/O module. By the first set of signals, the I/O module tells the CPU module its link-width capabilities (i.e., its link-width request). By the second set of signals, the CPU module indicates the number of lanes that the CPU module has allotted, out of its fixed number of lanes, to the I/O module.

In an electronics system, the CPU module receives link-width requests from each I/O module, and determines the aggregate link-width demand. Having a fixed number of lanes, the CPU module determines how to distribute these lanes to the I/O module slots, and communicates the allotted number to each I/O module slot using the second set of signals of the sideband interface. Bifurcation may be a factor in determining the distribution of the lanes. Some CPU modules have root complexes that do not auto-bifurcate. For such configurations, the sideband interface provides another signal that an I/O module can send to the CPU module for purposes of requesting bifurcation.

Figure 1:
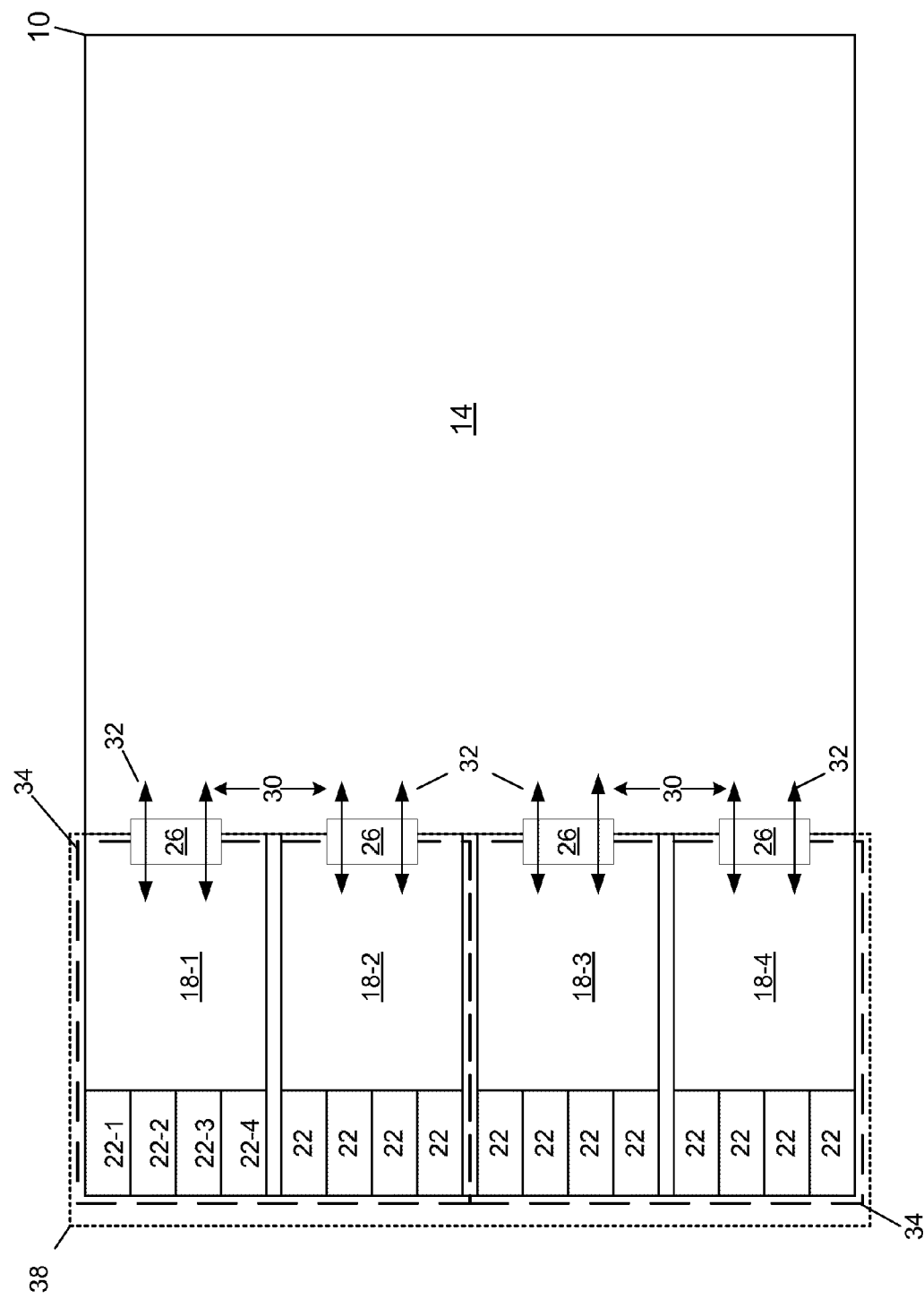
FIG. 1 is a block diagram of an embodiment of an electronics system embodying the invention.

FIG. 1 shows an embodiment of an electronics system 10, such as a data storage system, constructed in accordance with the invention. The electronics system 10 has a CPU module 14 in communication with a plurality of I/O modules 18. In this embodiment, the electronics system 10 has four I/O modules 18-1, 18-2, 18-3, and 18-4 (generally, 18). Examples of types of I/O modules 18 include, but are not limited to, Fibre Channel, iSCSI (Internet SCSI), FICON (Fibre Connectivity), SAS (serial attached SCSI), Infiniband, and Ethernet (10/100/1000 Base-T).

Each I/O module 18 has a plurality of I/O ports 22. Here, as a representative example, the I/O module 18-1 has four I/O ports 22-1, 22-2, 22-3 and 22-4 (generally, 22). Each I/O module 18 is coupled directly to the CPU module 14 through an I/O module slot connector 26. In another embodiment, the I/O module slot connectors 26 couple the CPU module 14 and I/O modules 18 to a midplane through which the modules 14, 18 communicate. Communication between the CPU module 14 and each I/O module 18 occurs through an I/O module slot connector 26 over a PCI-E link 30 comprised of one or more lanes and over a sideband interface 32. In brief overview, the CPU module 14 determines the number of lanes in each link 30 based on, for example, the number of lanes available and the aggregate number of lanes requested by the four I/O modules 18 through the sideband interface 32.

In alternate embodiments, the electronics system 10 can have two doublewide I/O modules 34 (dashed lines), each replacing an adjacent pair of singlewide I/O modules 18, or a single quad-wide I/O module 38 (dotted lines) instead of the four singlewide I/O modules 18. In addition to communicating their link-width capabilities, doublewide and quad-wide I/O modules use coded signals of the sideband interface 32 to tell the CPU module 14 of the size of that I/O module. In addition, doublewide and quad-wide I/O modules use another coded signal of the sideband interface 32 to request that the CPU module 14 not bifurcate links 30 sent to the I/O module slot connectors 26 of those I/O modules.

Figure 2:
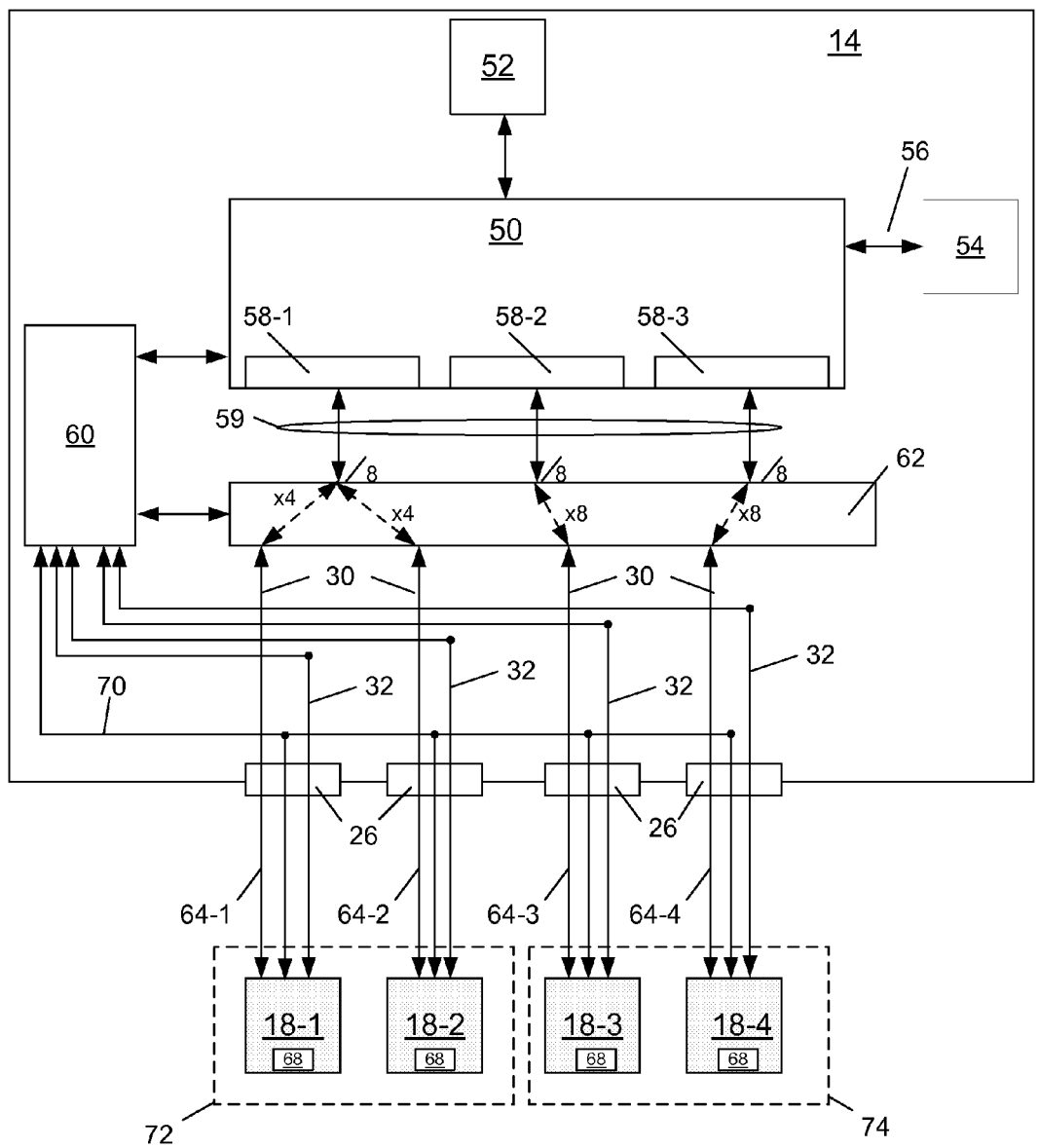
FIG. 2 is a block diagram of a CPU module in communication with a plurality of I/O modules through a PCI-E interface and a sideband interface used by the I/O modules and the CPU module to exchange link-width capabilities.

FIG. 2 shows one embodiment of the CPU module 14 with an MCH (memory controller hub) device 50, also called a Northbridge, which is in communication with a processor system 52 and with memory 54 over a memory bus 56. The MCH device 50 has PCI-E ports 58-1, 58-2, and 58-3 (generally 58), and has a fixed number of lanes 59 by which to communicate with the I/O modules 18 through these PCI-E ports 58.

Here, as an example, the MCH device 50 has 24 lanes, with the PCI-E ports 58 being configured to handle 8 lanes each. The MCH device 50 has strapping bits that determine the link-widths of the ports 58 and uses the bit values stored in these strapping bits to train the links. Through software control of these strapping bits, the link width of each port 58 can be defined or changed (which settings take effect after the MCH device 50 is reset). In one embodiment, the MCH device 50 is implemented with the Intel® 5000P Chipset Memory Controller Hub, manufactured by Intel Corporation of Santa Clara, Calif. For the Intel® 5000P Chipset Memory Controller Hub, the strapping bits are referred to as PEWIDTH[3:0]. Implementations of the MCH device 50 can use other chipsets including, but not limited to, the Intel® E7250 Chipset Memory Controller Hub, manufactured by Intel Corporation.

In addition, the CPU module 14 includes a microcontroller unit (MCU) 60 in communication with switching logic 62.

The MCU 60 is configured to hold the CPU module 14 and I/O modules 18 in reset when the electronics system 10 starts up (i.e., to forestall training between the modules 14, 18). The switching logic 62 comprises protocol switches and analog switches for routing lanes 59 grouped into cohesive links 64 to the I/O module slot connectors 26. Although illustrated as separate components, the MCU 60 and switching logic 62 can be implemented as a single integrated circuit (e.g., a complex Programmable Logic Device or cPLD). In addition, although shown as part of the CPU module 14, aspects of the MCU 60 and switching logic 62 can be implemented at each of the I/O modules 18 or on an intervening board or module that connects between the CPU module 14 and the I/O modules 18 for purposes of handling the routing of links from ports 58 to slot connectors 26. The intervening board can have a base design as a hardwired board, or a complex and flexible routing board based on customer needs.

The I/O modules 18 are in communication with the MCU 60 over the sideband interface 32 by which the I/O modules 18 submit their link-width capabilities (also referred to as link-width requests) to the MCU 60 and by which the MCU 60 reports the link width allotted to each I/O module 18.

In one embodiment, each I/O module 18 has a resume PROM (programmable read-only memory) 68 that stores product information about that I/O module, such as the speed and protocol of the I/O module (e.g., Fibre Channel, 1 Gigabit Ethernet). The MCU 60 is in communication with each resume PROM 68 over a bus 70 (e.g., an I²C bus) to acquire this information.

Some MCH devices 50 are able to bifurcate the fixed number of lanes of a given PCI-E port 58; instead of all lanes of the PCI-E port 58 being part of a single link to one I/O module, the lanes can be divided into two separate links to two distinct I/O modules. In the present example, the PCI-E port 58-1 is bifurcated into two ×4 links 64-1 and 64-2. Link 64-1 passes to I/O module 18-1 and link 64-2 passes to I/O module 18-2. The other PCI-E ports 58-2, 58-3 are not bifurcated. All 8 lanes of each PCI-E port 58-2, 58-3 pass a single link 64-3, 64-4 to I/O modules 18-3, 18-4, respectively. For some chipsets, such as the Intel® 5000P, bifurcation requires manual configuration. Such manual configuration can be attained by setting a particular strapping bit of the MCH device 50 (e.g., PEWIDTH[3] for the Intel® 5000P). Other chipsets, such as the Intel® E7250 support auto-bifurcation.

As an illustrative example, if a doublewide I/O module 72 with a ×8 link-width capability replaces I/O modules 18-1, 18-2, the PCI-E port 58-1 does not bifurcate as it does for the two distinct I/O modules 18-1 and 18-2. Depending on its configuration, the switching logic 62 can send four lanes to each connector 26 (as shown) or send all eight lanes to one of the two connector 26 (and none to the other connector 26).

As another illustrative example, if a doublewide I/O module 74 with a ×8 link-width capability replaces I/O modules 18-3, 18-4, the MCU 60 configures the switching logic 62 to route eight lanes from one of the PCI-E ports 58-2, 58-3 to one of the connectors 26. The unused eight lanes of the other PCI-E port can be routed elsewhere, if need be. The doublewide module 74 uses sideband signals received from the MCU 60 to determine to which of the two connectors 26 the link has been routed.

Figure 3:
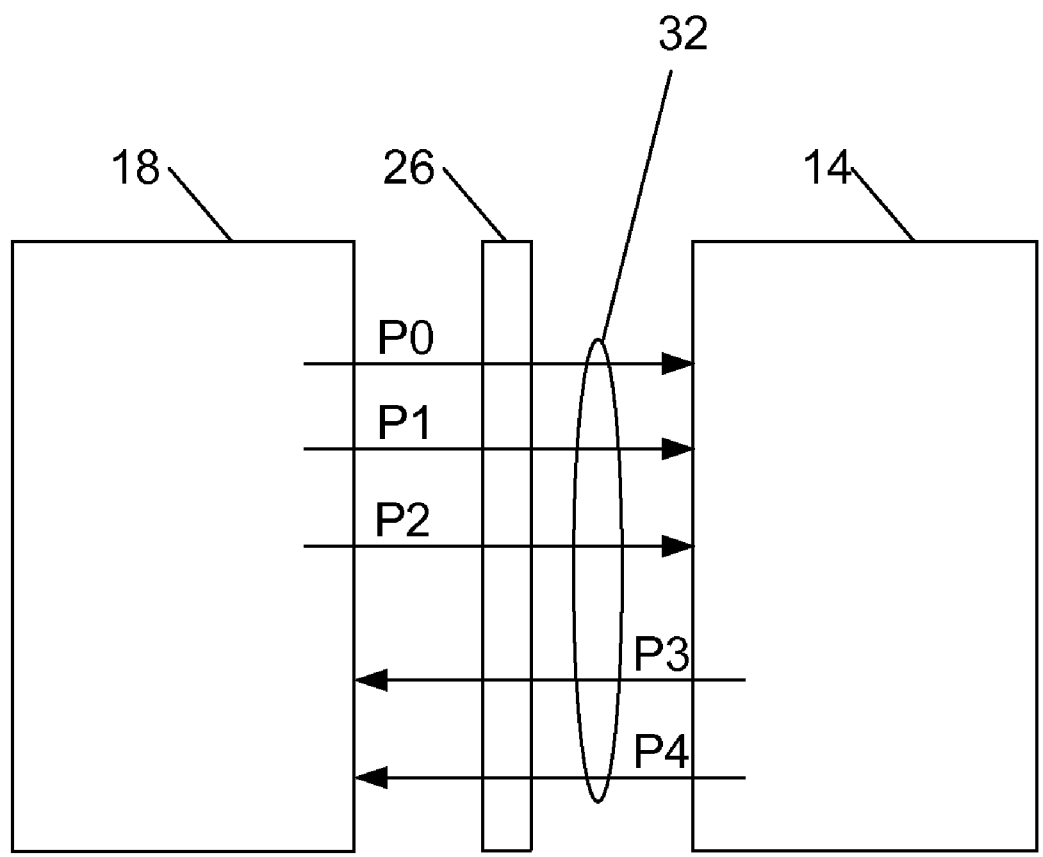
FIG. 3 is a block diagram illustrating an embodiment the sideband interface between an I/O module and the CPU module through an I/O module slot connector, the sideband interface having two sets of signals.

FIG. 3 generally illustrates one embodiment of the sideband interface 32 used by each I/O module 18 to exchange link-width capability information with the CPU module 14. The sideband communication passes through the slot connector 26 over connector pins (here, labeled P0, P1, P2, P3, and P4) dedicated for conveying link-width capability information. In the embodiment shown, each I/O module 18 encodes its maximum link-width capability using three pins P0, P1, and P2 (sometimes broadly referred to as signal lines). Use of three signal lines enables an I/O module 18 to encode one of eight different link-width capabilities. Table 1 provides one exemplary set of codes that a given I/O module can communicate to the CPU module 14 using the P0, P1, P2 signal lines of the sideband interface 64.

TABLE 1

| P2 | P1 | P0 | Description of I/O module Capability |
|----|----|----|---------------------------------------|
| 0 | 0 | 0 | Singlewide, 1x4 capable, received x4 on a single connector. Also used with legacy CPU Modules, that supply only 4 lanes to a singlewide I/O module slot, and require manual bifurcation. |
| 0 | 0 | 1 | Singlewide, 1x8 capable, received x8 on a single connector. Also used with legacy CPU Modules, that supply only 4 lanes to a singlewide I/O module slot, and require manual bifurcation. |
| 0 | 1 | 0 | Doublewide, 2x8 capable, receives x8 on each of two connectors. |
| 0 | 1 | 1 | Doublewide, 1x8 capable, receives x4 on each of to connectors. |
| 1 | 0 | 0 | Unused |
| 1 | 0 | 1 | Singlewide, 2x4 capable, receives 2x4 on one connector. |
| 1 | 1 | 0 | Quad-wide, 1x16 capable, receives x4 on each of four connectors. |
| 1 | 1 | 1 | Doublewide, 1x16 capable, receives x8 on each of four connectors. |

In addition, each I/O module 18 receives two signals from the CPU module 14 over pins P3, P4, which encode the link width allocated to the I/O module 18. With two signal lines, a CPU module can encode one of four different possible link-width configurations. Table 2 provides one exemplary set of codes that the CPU module 14 can communicate to a given I/O module 18 using the P3, P4, signal lines of the sideband interface 32.

TABLE 2

| P4 | P3 | CPU Module Capability |
|----|----|-----------------------|
| 0 | 0 | 1x4 capable, delivers x4 to a single connector. |
| 0 | 1 | 1x8 capable or 2x4 capable; delivers 8 lanes to a single connector. |
| 1 | 0 | 2x4 capable only; delivers 2x4 to a single connector (cannot deliver 1x8). |
| 1 | 1 | Available for future capability (e.g., 1x16 capable). |

The CPU module 14 and I/O modules 18 can employ passive circuitry to set (i.e., hardwire) the voltage levels carried by the pins or use firmware to drive the pins to a desired voltage level. When hardwiring the pins, the I/O module 18 can either couple a pull-down resistor to a pin to drive the corresponding signal to ground (0 v) or leave the pin unconnected (No Connect or NC) to allow the pin to be pulled high (1.5 v) by a pull-up resistor at the CPU module 14. The CPU module 14 can use pull-up resistors or pull-down resistors to hardwire the P3 and P4 signals to a supply voltage level (e.g., 3.3 volts) or to ground (0 v), respectively.

The number of signal lines in the sideband interface 32 is exemplary: the principles of the invention can be practiced with as few as one sideband signal by which the I/O module can communicate its link-width capability, and without using any sideband signals for the CPU module to communicate its link-width capability. Although having only one bit with which to encode I/O module capabilities limits the number of different types of I/O modules that can practice the invention, the principles of the invention are unchanged. In such an embodiment, a given I/O module is able to communicate one of two possible capabilities (e.g., either 1×4 or 1×8), and the CPU module 14 can configure the MCH device 50 in accordance with the capabilities communicated by the I/O module so that the I/O module acquires the requested link width during training. Generally, an I/O module (particularly a singlewide I/O module) may not need to know what link-width the CPU module has allotted it, since this link-width is subsequently established during training. In addition, other embodiments of the sideband interface can employ more than the five signal lines shown to enable more types of CPU and I/O modules to practice the invention.

Figure 4:
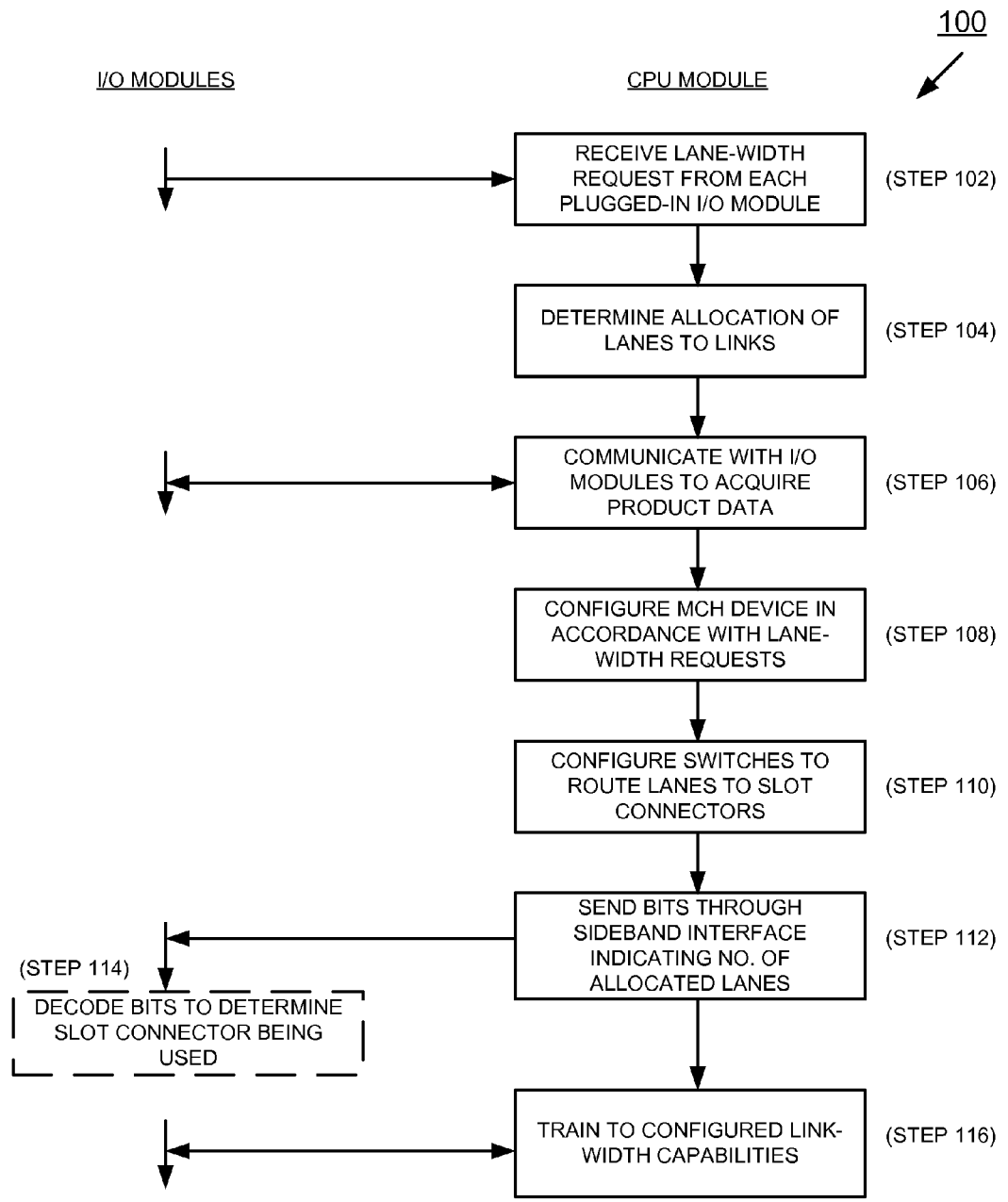
FIG. 4 is a flow diagram of an embodiment of a process for distributing PCI-E lanes by the CPU module to the plurality of I/O modules in accordance with the invention.

FIG. 4 shows an embodiment of a process 100 for distributing the lanes of a PCI-E-based CPU module 14 to a plurality of PCI-E-based I/O modules 18. The sideband interface of the invention may enable any type and generation of CPU module and any type and generation of I/O module to participate in the process 100, depending upon the particular codes used to signify CPU and I/O module types. In the description of the process 100, reference is also made to FIG. 2.

At start up of the electronics system 10, while holding the MCH device 50 and I/O modules 18 in reset to forestall training, the MCU 60 of the CPU module 14 receives (at step 102) coded signals representing the maximum link-width capability of each I/O module 18 plugged into one of the I/O module slot connectors 26. Based on these link-width capabilities and on the total number of lanes available, the MCU 60 determines (step 104) the number of lanes 59 to allocate to each link 64 between the MCH device 50 and one of the I/O modules 18.

The MCU 60 can employ any one of a variety of algorithms to determine this allocation. For example, the MCU 60 can allocate to each I/O module 18 the number of lanes requested by that I/O module 18, provided the MCH device 50 has a sufficient number of lanes to supply the aggregate demand. If the aggregate demand is in excess of the total number of available lanes, the MCU 60 can choose, for example, to distribute the average number of lanes to each I/O module (i.e., number of available lanes divided by number of I/O modules plugged in the slot connectors); and any lanes remaining unallocated can be allocated to an I/O module with a link-width capability that is greater than the average number.

In one embodiment, the MCU 60 communicates (step 106) with the resume PROM 68 of each I/O module 18 over the I²C bus 70 to acquire product data (e.g., the speed and technology) recorded therein for each I/O module 18. The distribution of lanes can then take into consideration the information gathered from the resume PROMs 68 of the I/O modules 18. For example, the MCU 60 can decide to ensure that Fibre Channels modules receive ×8 links, whereas 1 Gigabit Ethernet modules receive ×4 links.

After determining the allocation of lanes to I/O modules 18, the MCU 60 dynamically configures (step 108) the link widths of the ports 58 of the MCH device 50 (i.e., via strapping bits). For some types of the MCH device 50, the bit value stored in a particular strapping bit determines whether a certain port bifurcates. The MCU 60 also sets (step 110) the protocol and analog switches of the switching logic 62 to generate routes that electrically connect the links 64 originating from each port 58 to the appropriate I/O module slot connectors 26. For example, the switching logic 62 can route four lanes of the port 58-1 to the I/O module 18-1 and four lanes to the I/O module 18-4.

At step 112, the MCU 60 sends bit signals to each I/O module 18 through the sideband interface 32 indicating the number of lanes allocated to that I/O module 18. The I/O modules 18 (i.e., doublewide and quad-wide I/O modules) may use these bit signals to identify (step 114) the slot connector 26 to which the link is connected. The MCU 60 takes the CPU module 14 and I/O modules 18 out of reset so that the modules 14, 18 begin to train (step 116) to the link-width capabilities established for each link 64 by the configuration of the MCH device 50.

Figure 5:
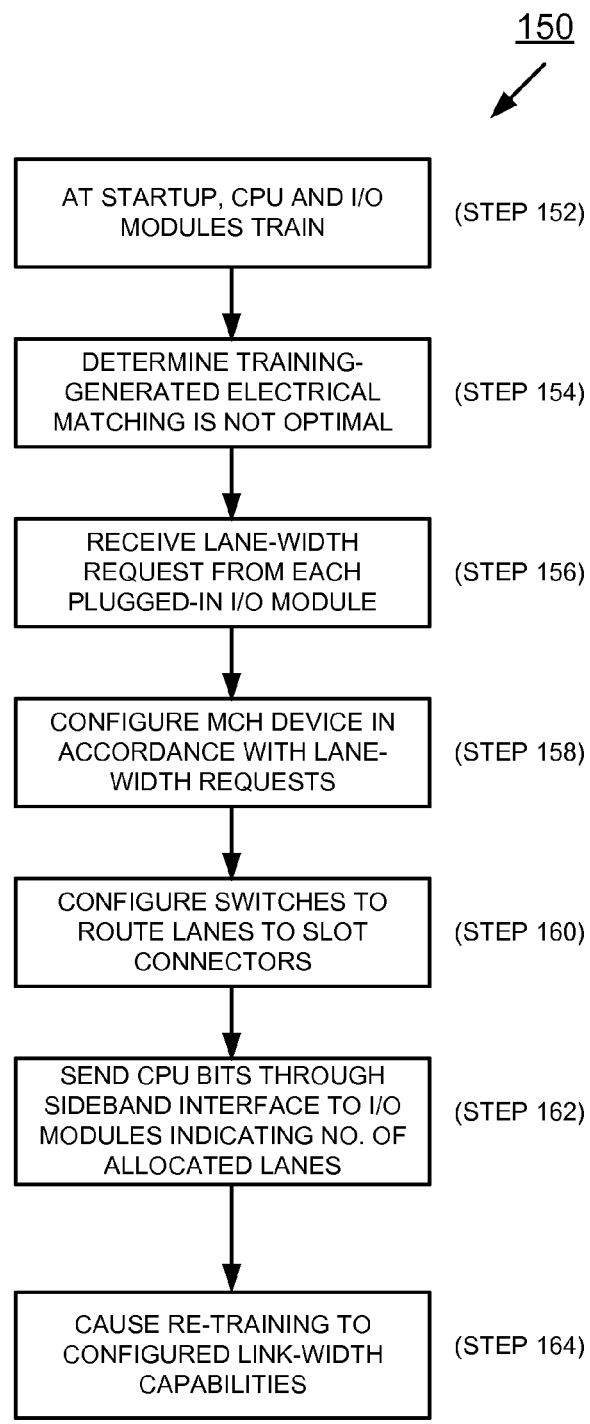
FIG. 5 is a flow diagram of another embodiment of a process for distributing PCI-E lanes by the CPU module to the plurality of I/O modules in accordance with the invention.

FIG. 5 shows an embodiment of a process 150 for distributing the number of lanes of a PCI-E-based CPU module 14 to a plurality of PCI-E-based I/O modules 18 for an electronics system in which the MCU 60 device does not participate in the distribution process. In the description of the process 150, reference also is made to FIG. 2.

During startup of the electronics system 10, the CPU module 14 and I/O modules 18 begin to train (step 152). After the training, the processor system 52 determines (step 154) that the electrical matching between the CPU module 14 and a given I/O module 18 is not optimal. For example, training to the lowest common link-width capability may cause the I/O module to receive a ×4 link although the I/O module is ×8-capable. Conversely, the CPU module 14 may route a ×8 link to a slot connector 26 to which a ×4-capable I/O module is coupled. If both types of mismatches exist in the electronics system 10, the processor system 52 may be able to alert personnel, prompting personnel to swap the I/O modules.

Alternatively, the processor system 52 can acquire (step 156) the link-width capabilities of the I/O modules 18 through the sideband interface 32, configure (step 158) the MCH device 50 according to a distribution algorithm, and set (step 160) the switching logic 62 to route the lanes 59 to the appropriate slot connector 26. As part of acquiring the link-width capabilities, the processor system 52 may query the resume PROM 68 at each I/O module to obtain product data. At step 162, the coded signals representing the link-width allocated to each I/O module are transmitted to that I/O module over the sideband interface 32. The processor system 52 then causes training (step 164) to occur again (i.e., the MCH device 50 and I/O modules are reset and brought out of reset), the MCH device 50 now being preconfigured to produce optimal electrical matching. For the situation described in the previous example, a ×8 link 64 may now be routed to the slot connector 26 coupled to the ×8-capable I/O module and a ×4 link 64 may be routed to the slot connector 26 coupled to the ×4-capable I/O module.

Figure 6:
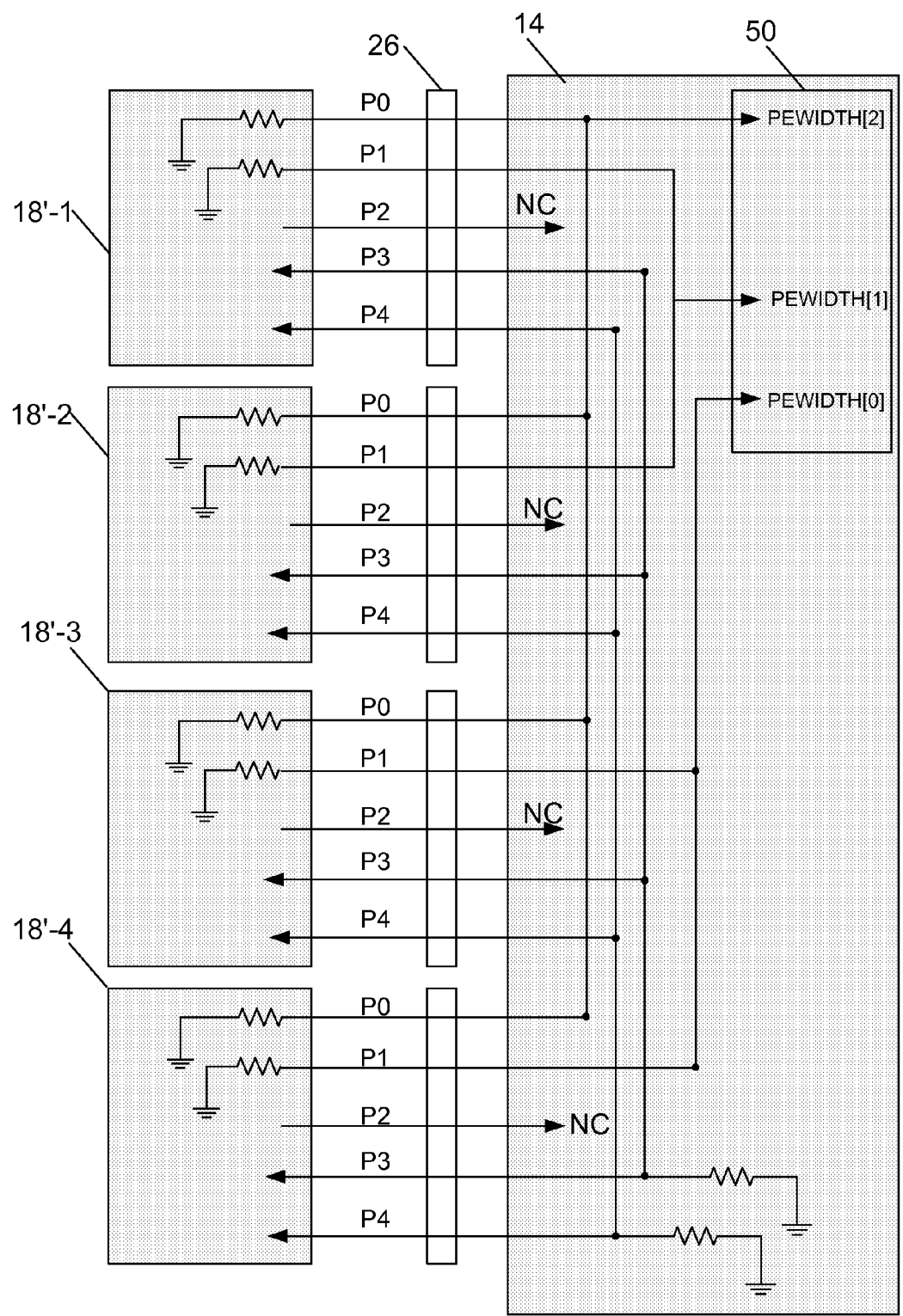
FIG. 6 is a block diagram showing an exemplary use of the sideband interface to exchange link-width capabilities between four singlewide I/O modules and the CPU module.
Figure 7:
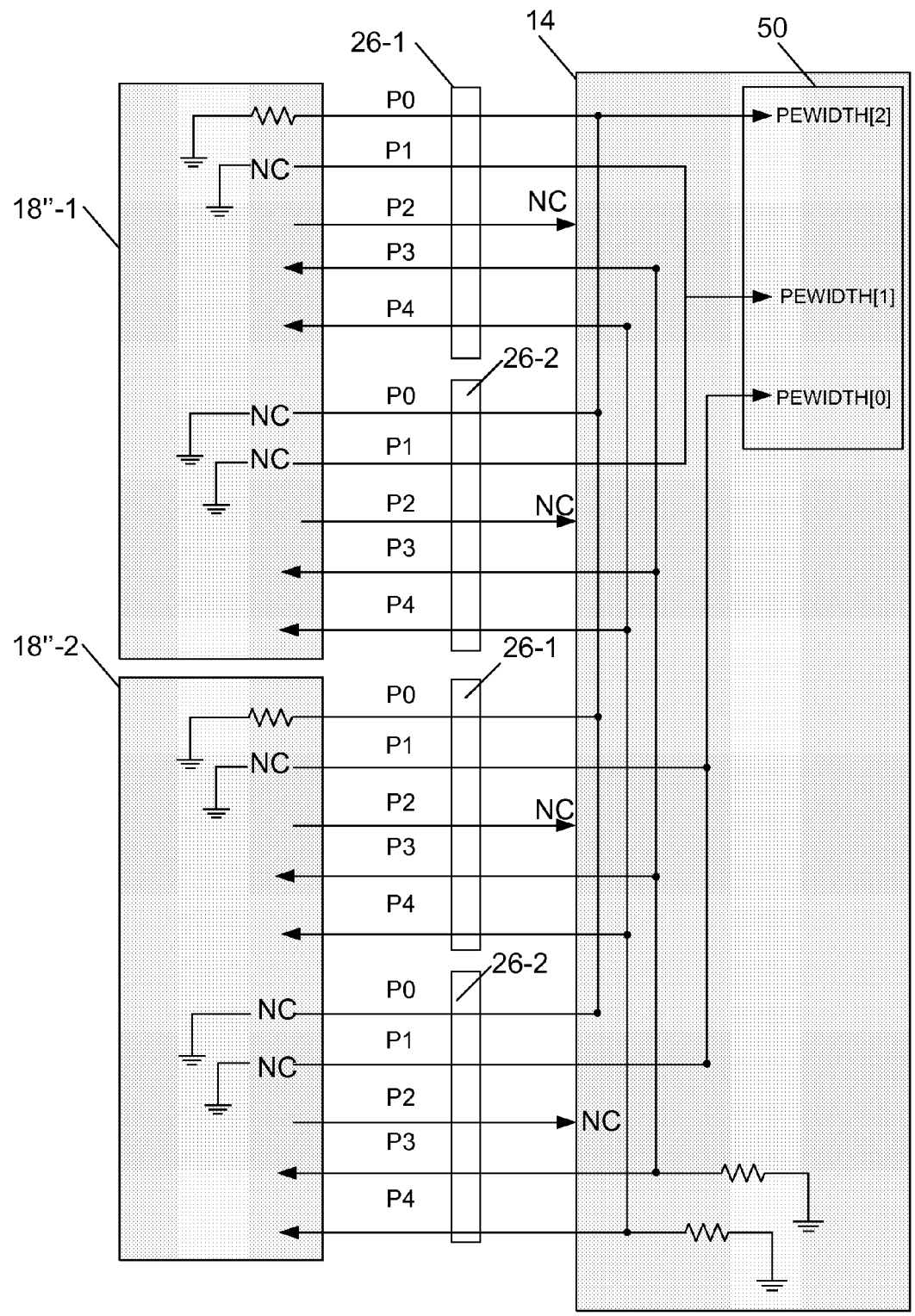
FIG. 7 is a block diagram showing another exemplary use of the sideband interface to exchange link-width capabilities between two doublewide I/O modules and the CPU module.

FIG. 6 and FIG. 7 illustrate different specific embodiments of sideband communication between different types of I/O modules 18 and the CPU module 14. FIG. 6 shows sideband communication between four singlewide I/O modules 18'-1, 18'-2, 18'-3, and 18'-4 (generally, 18') and the CPU module 14, and FIG. 7 shows sideband communication between two doublewide I/O modules 18"-1, 18"-2 (generally, 18") and the CPU module 14. Each doublewide I/O modules 18" communicates with the CPU module 14 through two slot connectors 26-1, 26-2.

In FIG. 6, each of the four I/O modules 18' sends coded signals over three pins, P0, P1, and P2, to the CPU module 14, and receives coded signals over two pins, P3 and P4, from the CPU module 14. Each module 18' uses a pull-down resistor to ground P0 of the corresponding connector 26, thus sending a 0 v signal to the CPU module 14. At the CPU module 14, the signals arriving on pin P0 from the four I/O modules 18' are ganged and passed to the MCH device 50, where 0 v signal is stored as a bit value of 0 in one of the strapping bits of the MCH device 50 (here, e.g., called PEWIDTH[2] for an Intel® 5000P MCH).

Similarly, each I/O module 18' uses a pull-down resistor to ground P1 of the corresponding connector 26. At the CPU module 14, the P1 signals of I/O modules 18'-1 and 18'-2 are ganged and pass to the MCH device 50, where a binary value of 0 is stored in a second strapping bit, referred to as PEWIDTH[1]. In addition, the P1 signals of I/O modules 18'-3 and 18'-4 are ganged and pass to the MCH device 50, to be stored as a binary value of 0 in a third strapping bit referred to as WIDTH[0]. Wiring the P0 and P1 signals directly to the strapping bits of the MCH device 50 is one mechanism by which to configure the MCH device 50 before the MCH device 50 comes out of reset.

Each I/O module 18' further allows pin P3 to float (no pull-down). At the CPU module 14, there are no connections (NC) for receiving a voltage level on pin P3. Although not used in this embodiment, other types of I/O modules can send a voltage level over pin P3 to contribute to communicating their link-width capabilities. In this example, when PEWIDTH[2], PEWIDTH[1], and PEWIDTH[0] are equal to '000', the ports 58 of the MCH device 50 are configured to ×4 links.

In this embodiment, the CPU module 14 hardwires each of the P3 and P4 pins to ground (0 v) through a pull-down resistor (e.g., 100 ohms). Alternatively, the CPU module 14 can use firmware to drive the P3 and P4 pins signals low. According to TABLE 2 above, when P3 and P4 are equal to '00", then the CPU module 14 is routing a ×4 link to each slot connector 26.

In FIG. 7, each doublewide I/O module 18" uses a pull-down resistor to ground pin P1 for one of its two connectors 26-1 and allows the pin P1 of its other slot connector 26-2 to float (i.e., NC). In addition, each I/O module 18" allows pins P2 and P3 on both connectors 26-1, 26-2 to float. At the CPU module 14, the four signals arriving on pin P1 from the two I/O modules 18" are ganged and stored in the PEWIDTH[2] strapping bit as a 0 bit value. The two voltage levels arriving on pin P2 from one I/O module 18"-1 are ganged and stored in the PEWIDTH[1] strapping bit as a 1 bit value, and the two voltage levels arriving on pin P2 from the other I/O module 18"-2 are ganged and stored in the PEWIDTH[0] strapping bit as a 1 bit value. In this example, when PEWIDTH[2], PEWIDTH[1], and PEWIDTH[0] are equal to '011', the ports 58 of the MCH device 50 are configured to ×8 links. However, because the CPU module 14 is hardwired to route a ×4 link to each slot connector 26, the doublewide I/O module 18" needs to get all ×8 lanes from both connectors.

Aspects of the present invention may be embodied in hardware, firmware, or software (i.e., program code). Program code may be embodied as computer-executable instructions on or in one or more articles of manufacture, or in or on computer-readable medium. A computer, computing system, or computer system, as used herein, is any programmable machine or device that inputs, processes, and outputs instructions, commands, or data. In general, any standard or proprietary, programming or interpretive language can be used to produce the computer-executable instructions. Examples of such languages include C, C++, Pascal, JAVA, BASIC, Visual Basic, and C#.

Examples of articles of manufacture and computer-readable medium in which the computer-executable instructions may be embodied include, but are not limited to, a floppy disk, a hard-disk drive, a CD-ROM, a DVD-ROM, a flash memory card, a USB flash drive, an non-volatile RAM (NVRAM or NOVRAM), a FLASH PROM, an EEPROM, an EPROM, a PROM, a RAM, a ROM, a magnetic tape, or any combination thereof. The computer executable instructions may be stored as, e.g., source code, object code, interpretive code, executable code, or combinations thereof. Further, although described predominantly as software, embodiments of the described invention may be implemented using hardware (digital or analog), firmware, software, or a combination thereof.

While the invention has been shown and described with reference to specific preferred embodiments, it should be understood by those skilled in the art that various changes in form and detail may be made therein without departing from the spirit and scope of the invention as defined by the following claims.

What is claimed is:

1. In an electronics system having a PCI Express-based processor (CPU) module in communication with a plurality of PCI Express-based input/output (I/O) modules, the CPU module having a fixed number of lanes with which to communicate with the I/O modules, a method for distributing the lanes among the I/O modules, the method comprising:
   receiving, by the CPU module, a coded signal from each I/O module through a sideband interface between the CPU module and that I/O module;
   identifying a link-width capability of each I/O module from the coded signal received from that I/O module through the sideband interface between the CPU module and that I/O module;
   configuring the CPU module to allocate a link width to each I/O module based on the fixed number of lanes and the link-width capability identified from the coded signal received from that I/O module;
   transmitting from the CPU module to each I/O module through the sideband interface between the CPU module and that I/O module a second coded signal that communicates to that I/O module the link width allocated to that I/O module; and
   training a link between the CPU module and each I/O module in accordance with the link width allocated to that I/O module.

2. The method of claim 1, wherein one of the I/O modules is a doublewide I/O module spanning two slot connectors, and further comprising the step of determining, from the second coded signal received by the doublewide I/O module from the CPU module, to which of the slot connectors are routed lanes allocated to the doublewide I/O module.

3. The method of claim 1, further comprising the step of transmitting another coded signal to the CPU module through the sideband interface between the CPU module and a given I/O module that instructs the CPU module to bifurcate a link of a given port of the CPU module.

4. The method of claim 1, further comprising the step of dynamically configuring switches to route lanes from a given port of the CPU module to the I/O module to which those lanes are allocated.

5. The method of claim 1, further comprising the step of acquiring performance-related information from each I/O module; and wherein the basis for configuring the CPU module includes the performance-related information acquired from that I/O module.

6. An electronics system comprising:
   a PCI Express-based I/O module; and
   a PCI Express-based central processing unit (CPU) module in electrical communication with the I/O module through a PCI Express interface and through a sideband interface, the CPU module receiving through the sideband interface a coded signal and identifying from the coded signal a link-width capability for the I/O module, the CPU module being configured to allocate a link width to the I/O module based on the link-width capability identified from the coded signal received from the I/O module, the CPU module transmitting through the sideband interface a second coded signal that communicates to the I/O module the link width allocated to the I/O module, wherein the I/O module and CPU module train in accordance with the link-width allocated to the I/O module.

7. The electronics system of claim 6, wherein the I/O module transmits another coded signal to the CPU module through the sideband interface instructing the CPU module to bifurcate a link of a given port of the CPU module.

8. The electronics system of claim 6, further comprising switching logic having dynamically configurable switches that route allocated lanes from a given port of the CPU module to the I/O module.

9. The electronics system of claim 6, wherein the I/O module includes persistent memory that stores performance-related information about the I/O module, and wherein the basis for configuring the CPU module includes the performance-related information of that I/O module.

10. The electronics system of claim 6, wherein the CPU module includes a memory controller hub (MCH) device and a microcontroller unit (MCU) in communication with the I/O module to receive the coded signal from which the link-width capability of the I/O module is identified, the MCU holding the MCH device and I/O module in reset while configuring the MCH device in accordance with the identified link-width capability.

11. An electronics system comprising:
a plurality of PCI Express-based I/O modules; and
a PCI Express-based central processing unit (CPU) module in electrical communication with each I/O module through a PCI Express interface and through a sideband interface, the CPU module having a memory controller hub (MCH) device and switching logic, the CPU module receiving from each I/O module through a sideband interface a coded signal and identifying from the coded signal a link-width capability for that I/O module, the MCH device and switching logic being configured to allocate a link width to each I/O module based on an aggregate link-width demand of the I/O modules and on the link-width capability identified from the coded signal received from that I/O module, the CPU module transmitting a second coded signal to each I/O module through the sideband interface between the CPU module and that I/O module, the second coded signal transmitted to each I/O module communicating to that I/O module the link-width allocated to that I/O module, wherein each I/O module trains a link with the CPU module in accordance with the link-width allocated to that I/O module.

12. The electronics system of claim 11, wherein one of the I/O modules transmits another coded signal to the CPU module through the sideband interface between the CPU module and that one I/O module instructing the MCH device to bifurcate a link of a given port of the MCH device.

13. The electronics system of claim 11, wherein the switching logic has dynamically configurable switches for routing lanes from ports of the MCH device to each I/O module.

14. The electronics system of claim 11, wherein each I/O module includes persistent memory that stores performance-related information about that I/O module, and wherein the basis for configuring the MCH device includes the performance-related information of the I/O modules.

15. The electronics system of claim 11, further comprising a microcontroller unit (MCU) in communication with each I/O module to receive the coded signals from which the link-width capabilities of the I/O modules are identified, the MCU holding the MCH device and I/O modules in reset while configuring the MCH device and switching logic.

* * * * *